No. 630,666. Patented Aug. 8, 1899.
J. K. CUMMINGS.
COFFEE POT.
(Application filed May 2, 1899.)
(No Model.)
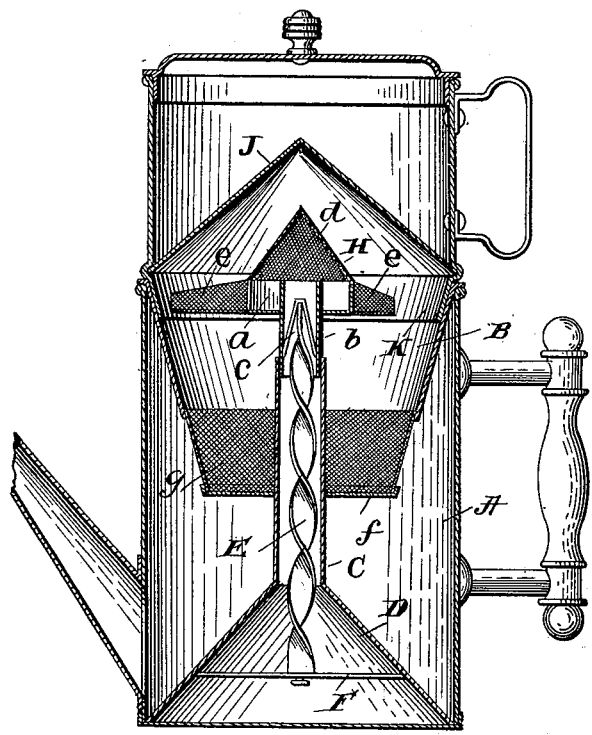
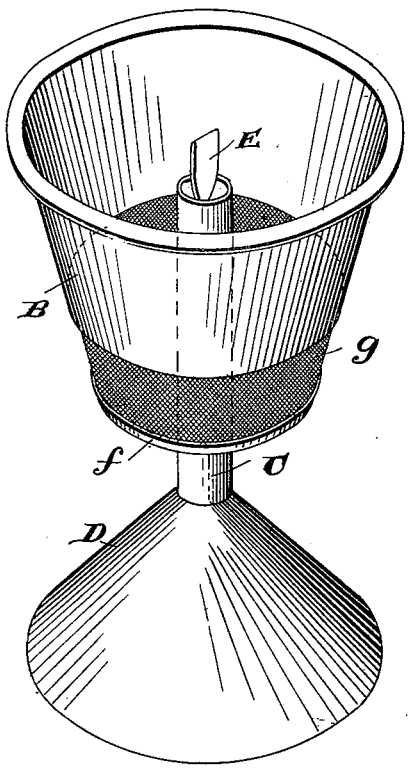
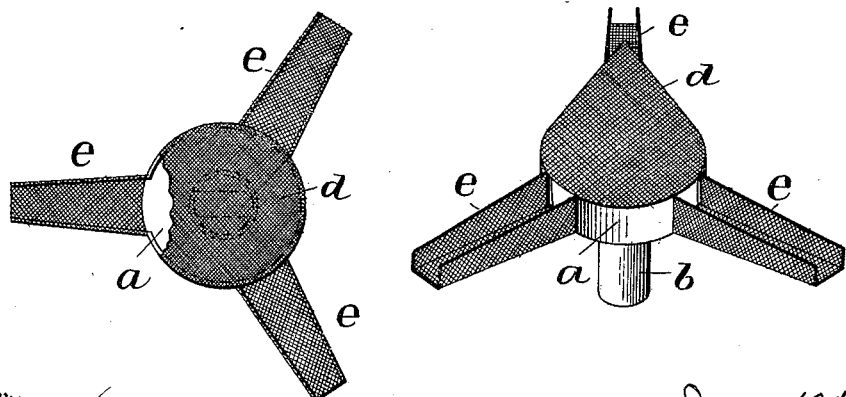
Witnesses
Geo. E. Frech.
Chas. R. Wright Jr.
Inventor
James K. Cummings
by A. S. Pattison
Attorney.

UNITED STATES PATENT OFFICE.

JAMES K. CUMMINGS, OF LADONIA, TEXAS.

COFFEE-POT.

SPECIFICATION forming part of Letters Patent No. 630,666, dated August 8, 1899.

Application filed May 2, 1899. Serial No. 715,324. (No model.)

*To all whom it may concern:*

Be it known that I, JAMES K. CUMMINGS, a citizen of the United States, residing at Ladonia, in the county of Fannin and State of Texas, have invented new and useful Improvements in Coffee-Pots, of which the following is a specification.

My invention relates to improvements in coffee-pots and pertains to a pot which is provided with a coffee-receptacle and a revolving sprinkler for furnishing hot water to drain through the coffee.

The object of my invention is to construct an attachment for coffee-pots which will cause an even supply of hot water to the ground coffee by a rotating sprayer-head, and thus furnish the hot water slowly but evenly to the ground coffee for draining therethrough and furnishing what is known as "drip-coffee."

In the accompanying drawings, Figure 1 is a vertical central section of my attachment, showing it in position in a coffee-pot. Fig. 2 is a detached view of the attachment. Fig. 3 is a detached view of the rotating sprayer-head.

Referring now to the drawings, A represents a coffee-pot which is of the usual form.

My invention pertains to a cup B, provided with a central upwardly-projecting tube C, which tube extends through the bottom of the cup and carries an inverted truncated cone-shaped portion D. Passing through the tube is a spirally-formed strip of metal E, which has its lower end journaled in a cross-bar F, extending across the truncated cone, and situated upon the upper end of this spiral strip is a sprinkling-head H. This sprinkling-head consists of a cup-shaped portion $a$, provided with a depending tube $b$, which is provided interiorly with an upwardly-projecting cap $c$, which receives the upper end of the spiral or spool. Mounted upon the upper edge of this cup-shaped portion $a$ is a cone-shaped perforated cap $d$, and projecting outwardly from this cup $a$ are a plurality of perforated troughs $e$. The inner ends of these perforated troughs are in communication with the cup $a$, and the tube projects upward just within the lower portion of the cone-shaped perforated cover, as clearly shown.

The cup B, into which the ground coffee is placed, is provided with a solid bottom $f$ and with a perforated portion $g$, extending upward a short distance from the bottom. Fitting within the top of this cup B is a condensing device consisting of a cup with a cone-shaped bottom J and which is provided with a flange K, fitting within the top of the coffee-containing cup B.

In operation when the hot water situated in the lower portion of the coffee-pot begins to boil the steam and hot water are forced upward through the central tube and supplied within the cup $a$ of the sprinkler. The passage of the steam and water through this central tube causes the spiral strip or rod to revolve, and thereby the sprinkler-head carried by the said rod. The steam striking the under side of the condensing device is condensed and the water is sprayed by the revolution of the spray-head. The water passing within the cup $a$ of the sprayer is carried onward through the perforated troughs by centrifugal force and is sprinkled or sprayed evenly over the ground coffee contained within the cup and passes through the coffee, taking up its essence, and back to the lower portion of the cup. The condenser causes a condensing of the steam, which prevents the escape of the aroma of the coffee, thus enabling me to make a coffee having the natural flavor of the bean.

While my invention is intended to be sold with a coffee-pot, it will be readily understood that it may be sold independent of the pot and applied thereto by the owner of a pot of the right size.

Having thus described my invention, what I claim, and desire to secure by Letters Patent, is—

1. A coffee-pot comprising a coffee-containing cup adapted to fit in the upper end of the pot and having a perforated lower portion, a centrally-arranged tube passing through the bottom of said cup and having at its lower end a truncated cone in communication with the lower end of the tube, a spirally-constructed rod or strip within the tube, and a sprayer-head carried at the upper end of the rod and in communication with the tube which contains the spiral rod, substantially as described.

2. An improved coffee-pot comprising a cup adapted to fit in the upper end thereof and having a lower perforated portion, a tube extending through the bottom of the cup and above the said bottom, the lower end of the tube provided with a truncated cone, a spirally-constructed strip within the said tube, and a sprayer-head in communication with the tube and carried by the spiral strip, said sprayer-head having radially-projecting troughs in communication with the head, substantially as described.

3. An improved coffee-pot comprising a cup adapted to fit in the upper end thereof and having a perforated lower portion, a tube passing through the bottom of and upward within the cup, a truncated cone carried at the lower end of the tube and in communication therewith, a spirally-arranged strip within the tube, a sprayer-head connected with the spiral strip and in communication with the tube, the sprayer-head comprising a cup-shaped device with a cover and radially-projecting troughs, substantially as described.

4. An improved coffee-pot comprising a cup adapted to fit in the upper end thereof, and provided with a perforated lower portion, a rod passing through the bottom thereof and extending above and below the bottom, the lower end of the tube having a truncated cone in communication therewith, a spiral strip within the tube, a sprayer comprising a cup-shaped head with a depending tube engaging the upper end of the spiral strip, the said cup having a perforated cover and perforated radially-extending troughs, substantially as described.

5. An improved coffee-pot comprising a cup adapted to fit in the upper end thereof, a tube passing through the cup and above the bottom thereof, the lower projecting end of the tube having a truncated cone in communication therewith, a spiral strip within the tube, a sprayer-head comprising a cup with a depending tube engaging the spiral strip, the sprayer-head having a perforated cover and perforated troughs extending radially therefrom, and a condensing-cup situated within the upper end of the coffee-cup, substantially as described.

In testimony whereof I have hereunto set my hand in the presence of two subscribing witnesses.

JAMES K. CUMMINGS.

Witnesses:
   JAS. P. MORROW,
   WILL HASKINS.